(No Model.)

W. S. JORDAN.
AUTOMATIC SPRINKLER.

No. 330,125. Patented Nov. 10, 1885.

Witnesses
S. N. Piper
L. N. Müller

Inventor
Wm. S. Jordan
by R. H. Eddy atty.

UNITED STATES PATENT OFFICE.

WILLIAM SUMNER JORDAN, OF WORCESTER, ASSIGNOR TO BRAMAN DOW & CO., OF BOSTON, MASSACHUSETTS.

AUTOMATIC SPRINKLER.

SPECIFICATION forming part of Letters Patent No. 330,125, dated November 10, 1885.

Application filed August 17, 1885. Serial No. 174,641. (No model.)

*To all whom it may concern:*

Be it known that I, WILLIAM SUMNER JORDAN, of the city and county of Worcester, of the Commonwealth of Massachusetts, have invented a new and useful Improvement in Automatic Sprinklers; and I do hereby declare the same to be described in the following specification and represented in the accompanying drawings, of which—

Figure 1:
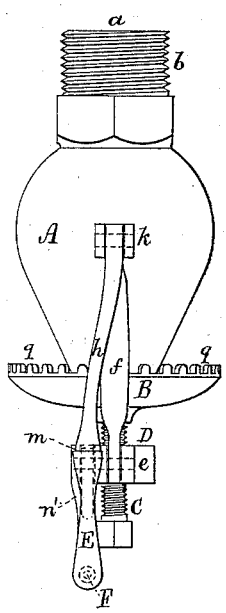
Figure 2:
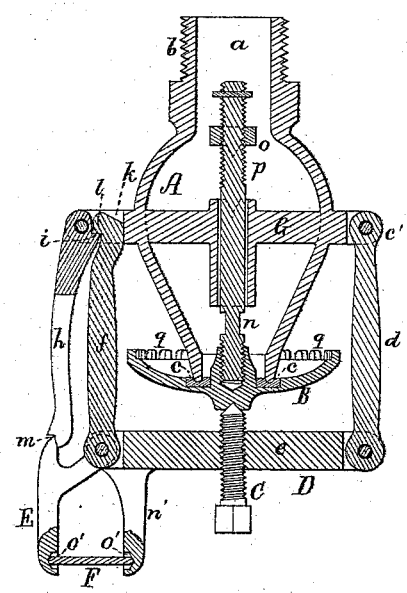

Figure 1 is a side view, and Fig. 2 a longitudinal and transverse section, of a sprinkler embodying my invention, the nature of which is defined in the claims hereinafter presented.

In such drawings, A denotes the body of the sprinkler, which is hollow and has a form ovoidal or approximately so. At top it is provided with a tubular induct, $a$, screw-threaded on its outer surface, as shown at $b$. At its lower end the said body is open and rests upon a soft-metal seat, $c$, formed within a shallow cup, B, resting on the upper end or point of a screw, C. The said screw C screws upward into and through the median link, $e$, of a three-linked chain, D, one terminal link, $d$, of which is jointed to an ear, $c'$, extending from the body A. The three links are shown at $d$, $e$, and $f$, that marked $f$ being hooked at its free end, as shown at $l$, to engage with a lever, $h$, fulcrumed to another ear, $k$, extending from the body A, and having a shoulder, $i$, to engage with the hook $l$. At its free end the lever $h$ has in it a notch, $m$, to receive the upper arm of a tri-armed lever, E, whose median arm is pivoted to the median link, $e$, at its free end, as shown, such median link being at such end provided with a downward tooth or projection, $n'$, between which and the lowest arm of the lever E and into recesses $o'$ $o'$ in them there is placed a short rod, F, of metal fusible at a very low temperature.

Within the body, and extending across it diametrically, is a bar, G, through whose middle is extended loosely a shank, $n$, that at its lower end is fixed to the cup B at the center thereof. On the upper part of the said shank there is screwed a nut, $o$, formed to straddle the bar G, so as to prevent the nut from revolving on the screw $p$ of the shank. By taking hold of the cup and revolving it when the chain is disconnected from the lever $h$ and the links are in line with each other the cup will be caused to rise toward the body A. By revolving the cup the opposite way it will depart from the body. Thus it will be seen that I have a means or mechanism not only for allowing the cup to fall downward away from the body, but to limit and vary the distance of such fall.

The cup has a series of teeth, $q$, projecting upward from it at its periphery, like the teeth of a gear. While the water is being discharged into and through the cup these teeth serve to divide it into streams.

The discharging or lower open end of the body A is to make with its seat in the cup a water-tight joint. In case of leakage taking place at such joint the screw C is to be revolved, so as to force the cup into closer contact with the body, and the cup is to be revolved or turned so as to grind or wear the seat into making a water-tight joint with the lower end of the body.

The above-described automatic sprinkler, when arranged for use in a room at the ceiling or other proper part thereof, is to be applied to an induction-pipe for the conveyance of water under pressure into it. In case of a fire taking place within the room or building and heating the atmosphere of the apartment sufficiently to cause the fusible connection to melt, the three-linked chain, on such fusion of the said connection taking place, will descend into a vertical position and allow the deflecting-cup to fall away from the discharging end of the body A until stopped by the nut $o$ falling upon the bar G.

The above-described automatic sprinkler will be found to be very efficient in extinguishing or in aiding in extinguishing a fire in a building or factory, as it can be readily adjusted to attain the best results under various changes of water-pressure in it. Without any necessity of shutting off the water its water-joint can easily be ground or rendered water-tight in case of leakage taking place through it. Furthermore, the piece of fusible metal, on becoming softened by heat, becomes crushed and bent. so as to allow the deflecting-cup to fall away with certainty from the body A.

When the fusible metal while subjected to heat has to be distended before breakage, it is liable not to operate with certainty.

I claim in the automatic sprinkler substantially as described—

1. The combination, with the body A, its deflector B, and their three-linked chain D and its screw C, of the projection $n'$, extending down from the median link of such chain, the tri-armed lever E, pivoted to such link, and the notched lever $h$, fulcrumed to the ear $k$ and adapted to engage, as described, with the link $f$ of the chain and with the said tri-armed lever, there being extended between the said projection $n'$ and the lowest arm of the tri-armed lever a rod of fusible metal, to serve, as set forth, to keep the chain and levers in engagement and to admit them on its melting to become disengaged in order to allow the deflector B to drop away from the body A for water to be discharged from the sprinkler, as explained.

2. The combination of the deflector B, provided with the row of teeth extending up from it at its periphery, as described, with the body A, the three-linked chain D, screw C, levers $h$ and E, and the projection $n'$, arranged and applied substantially as set forth.

3. The combination, with the body A, the deflector B, and the chain D, of a mechanism for supporting the piece of fusible metal with a crushing or contractile force, such mechanism, as described, being the projection $n'$, the tri-armed lever, and the notched lever, all being applied substantially and to operate as set forth.

WILLIAM SUMNER JORDAN.

Witnesses:
R. H. EDDY,
S. N. PIPER.